United States Patent [19]

Bennett et al.

[11] Patent Number: 4,599,249

[45] Date of Patent: Jul. 8, 1986

[54] METHOD TO IMPROVE FLOW CHARACTERISTICS OF WATER INSOLUBLE SOLID PARTICLES AND COMPOSITION

[75] Inventors: Robert P. Bennett, Bridgewater, N.J.; Robert L. Sokolove, Lexington, Mass.

[73] Assignee: Gus, Inc., Dallas, Tex.

[21] Appl. No.: 681,109

[22] Filed: Dec. 12, 1984

[51] Int. Cl.$^4$ .......................... B05D 7/00; C08L 1/08; C10L 9/00; C10L 10/00
[52] U.S. Cl. ........................................... 427/220; 44/6; 106/163.1; 106/170; 106/197.2
[58] Field of Search .............. 44/6; 427/220; 252/384; 106/163.1, 170, 197.2

[56] References Cited

U.S. PATENT DOCUMENTS

| | | | |
|---|---|---|---|
| 2,768,143 | 10/1956 | Henry | 106/197.2 |
| 3,455,714 | 7/1969 | Bishop et al. | 106/197.2 |
| 4,342,797 | 8/1982 | Kober et al. | 427/220 |
| 4,435,217 | 3/1984 | House | 106/197.2 |
| 4,486,335 | 12/1984 | Majewicz | 106/197.2 |

*Primary Examiner*—Michael R. Lusignan
*Attorney, Agent, or Firm*—Harry C. Post, III

[57] ABSTRACT

An aqueous solution is applied to water insoluble solid particles when flowing from one location to another location to improve the flow characteristics of the particles while inhibiting caking characteristics of the particles. The aqueous solution comprises a water soluble polymer derived from cellulose.

16 Claims, No Drawings

METHOD TO IMPROVE FLOW CHARACTERISTICS OF WATER INSOLUBLE SOLID PARTICLES AND COMPOSITION

It is well known that water insoluble solid particles, such as coal particles, when flowing from one location to another location, may cake when water is mixed with the particles. This caking causes clogs that prevent flow of the particles through channels and pipes in conveyors and storage hoppers with a relatively small cross-section thereby requiring larger conveyors and storage hoppers than necessary. Although the particles will flow easily when supported in large, such as more than 50 percent, quantities of water, this is not viable when the particles are coal particles being burned for heating, such as in electrical power generating plants, because of the resulting heat loss from the water.

One method of improving the flow characteristics of these particles is disclosed in U.S. Pat. No. 4,342,797. This patented method involves forming a surface coating on the wet particles. The disclosed coating is a fluid having the property of lowering the surface tension of the water. The fluid employed is a water solution of a substance selected from the group consisting of methyl and dimethyl naphthalene sulfonates and ethoxylated linear secondary alcohols with from 11 to 15 carbon atoms. It has been discovered, however, that this patented method and disclosed fluid fail to permit particles, specifically coal particles, to flow through openings with a cross-section as small as one might desire. Further, it has been discovered that when relatively porous particles, such as lignite coal particles, have been allowed to set or rest for a relatively short period of time, such as less than 24 hours, the fluid disclosed in this patent must be reapplied to provide the improved flow characteristics.

Accordingly, it is an object of the present invention to provide a method of improving the flow characteristics of water insoluble solid particles while inhibiting caking characteristics of the particles.

Further, it is an object of the present invention to provide a method of improving the flow characteristics of relatively porous water insoluble solid particles, more particularly lignite coal particles, while inhibiting caking characteristics of the particles.

Further, it is an object of the present invention to provide a method of improving the flow characteristics of water insoluble solid particles while inhibiting caking characteristics of the particles by applying an aqueous solution to the particles, the aqueous solution including water soluble polymer derived from cellulose.

Further, it is an object of the present invention to provide a method of improving the flow characteristics of water insoluble solid particles while inhibiting caking characteristics of the particles by applying an aqueous solution to the particles, the aqueous solution including a water soluble mixture consisting of sodium carboxymethyl cellulose and one or more of the materials selected from the group consisting of methyl and dimethyl naphthalene sulfonates and ethoxylated linear secondary alcohols with from 11 to 15 carbon atoms.

Further, it is an object of the present invention to provide a composition of matter to improve the flow characteristics of water insoluble solid particles while inhibiting caking characteristics of the particles.

Further, it is an object of the present invention to provide a composition of matter to improve the flow characteristics of relatively porous particles, more particularly lignite coal particles, while inhibiting caking characteristics of the particles.

Further, it is an object of the present invention to provide a composition of matter to improve the flow characteristics of water insoluble solid particles while inhibiting caking characteristics of the particles, which comprises an aqueous solution that includes a water soluble polymer derived from cellulose which is nonabsorbent relative to the particles.

Further, it is an object of the present invention to provide a composition of matter to improve the flow characteristics of water insoluble solid particles while inhibiting caking characteristics of the particles, which comprises an aqueous solution that includes a water soluble mixture consisting of sodium carboxymethyl cellulose and one or more of the materials selected from the group consisting of methyl and dimethyl naphthalene sulfonates and ethoxylated linear secondary alcohols with from 11 to 15 carbon atoms.

In accordance with the invention, a method is used to improve the flow characteristics of water insoluble solid particles while inhibiting caking characteristics of the particles. The particles are caused to flow from one location to another location. Applied to the flowing particles is an aqueous solution, which includes a water soluble polymer derived from cellulose with the polymer being nonabsorbent relative to the particles.

Further, in accordance with the invention a composition of matter is used to improve the flow characteristics of water insoluble solid particles while inhibiting the caking characteristics of the particles. The composition comprises a water soluble polymer derived from cellulose with the polymer being nonabsorbent relative to the particles.

The aqueous solution applied to the water insoluble solid particles comprises a water soluble polymer derived from cellulose. Preferably, the water soluble polymer constitutes from about 1 to about 10 percent by weight of the aqueous solution. Although this water soluble polymer may be anionic, such as sodium carboxymethyl cellulose, or nonionic, such as hydroxyethyl cellulose, the anionic sodium carboxymethyl cellulose is preferred when applied to relatively porous particles so as to be nonabsorbent relative to the particles. Further, when the aqueous solution is applied to lignite coal particles, the water soluble polymer derived from cellulose is preferably sodium carboxymethyl cellulose with a predetermined substitution of from about 0.1 to about 3.0 and, more preferably, with a predetermined substitution of from about 0.4 to about 0.7.

Also, the aqueous solution may include a water soluble mixture consisting of sodium carboxymethyl cellulose and one or more of the materials selected from the group consisting of methyl and dimethyl naphthalene sulfonates and ethoxylated linear secondary alcohols with from 11 to 15 carbon atoms. It is preferred that the aqueous solution include the sodium carboxymethyl cellulose constituting from about 1 to about 10 percent by weight of the aqueous solution and the one or more of the materials selected from the group consisting of methyl and dimethyl naphthalene sulfonates and ethoxylated linear secondary alcohols constituting from about 0 to about 16 percent by weight of the aqueous solution. Further, it is more preferred that the mixture in the aqueous solution be from about 2 to about 17 percent by weight of the aqueous solution and the mixture includes a weight ratio of the sodium carboxymethyl cellulose to the one or more of the materials selected from the group consisting of methyl and dimethyl naphthalene sulfonates and ethoxylated linear secondary alcohols being from about 10:0 to about 1:16.

All information disclosed in U.S. Pat. No. 4,342,797, including the one or more of the materials selected from the group consisting of methyl and dimethyl naphthalene sulfonates and ethoxylated linear secondary alcohols and the operation and testing of these materials, is incorporated herein by reference.

To determine the ameliorative effects of the composition disclosed in the present invention, a critical arching dimension (CAD) is determined for different samples of particles by applying varying amounts, ratios and mixtures of applicant's composition. The critical arching dimension is the minimum diameter of a vessel at which the particles will freely flow under specified moisture conditions. This critical arching dimension is determined by using the shear test cell apparatus disclosed in U.S. Pat. No. 4,342,797. A plot was made of the test results for each sample of material on a graph having the unconfined yield strength of the sample as the vertical axis and the consolidation weight applied to the sample during the shear test as the horizontal axis. A straight line having a slope of 1.2 is drawn through the intersection of the vertical and horizontal axes to obtain a point of intersection of the plot and the straight line. The critical arching dimension is obtained by determining the point of intersection; dividing the results of the shear test, as shown on the vertical axis of the graph by a horizontal line extending from the point of intersection, by the bulk density, as shown on the horizontal axis of the graph by a vertical line extending from the point of intersection; and then multiplying this result by 2.2.

Two shear test cells were employed to perform the testing. One shear test cell is commercially available from Jenike and Johanson named Flow Factor Tester and having model No. FT-3STE. The other is described in U.S. Pat. No. 4,342,797. The shear test cell described in the patent is constructed from a 4.5 inch length of 3.125 inch I.D. steel pipe. The pipe was cut into two lengths of 2 and 2.5 inches, and the mating surfaces of the two lengths were polished to a smooth finish. Alignment of the two lengths about the common axis is maintained by three pins, each passing through a set of flanges welded onto each segment of the pipe. The flanges were recesses 1/32 inch from the polished surfaces so as not to interfere with sliding motion of one piece relative to the other.

In operation, the two segments, held together with the pins, are mounted on a flat plate with the 2 inch segment beneath the 2.5 inch one. The bottom section is clamped, and the top section is connected to a weight platform by a string passing over a stationary pulley. The same side of the test cell faces the wheel and platform in every test.

The coal particles to be evaluated for shear strength (resistance to flow), usually 360.0 grams, were poured into the apparatus, broken up by inserting a spatula blade downward through the coal particles (with the insertions 45° apart), leveled by tapping, and compressed with a 4719 gram weight for 5 minutes. After the compressing weight and pins were removed, the shear strength of the column of coal was determined by adding weights to the platform in 10-gram increments, to apply lateral force to the top part of the cell until it was pulled off of the bottom.

Before each series of tests, the coal particles were screened to obtain −8 mesh particles and were dried of surface moisture by storing for 2-3 hours in an oven at 120°-130° F. Additions of water and treatments were calculated on the basis of these surface-dried coal particles.

In one series of tests on particles, the results shown in TABLE 1 were observed. Sample 1, 3 and 5 employ no aqueous mixture applied to the particles so as to establish a base from which the percent reduction in the Critical Arching Dimension (CAD) is determined. Samples 2.4 and 8 employ an aqueous solution having a total weight of 16.4 parts of a mixture consisting of 2 parts by weight of sodium carboxymethyl cellulose with a predetermined substitution of approximately 0.7 and a viscosity of 30-50 cP and 14.4 parts by weight of methyl and dimethyl naphthalene sulfonate (a ratio of the cellulose polymer to surfactant being 1:7.2), and 83.6 parts by weight of water. Sample 6 employs an aqueous solution having no cellulose polymer, 16 parts by weight of methyl and dimethyl naphthalene sulfonate and 84 parts by weight of water so as to establish the improvement obtained by the addition of the cellulose polymer. Sample 7 employs an aqueous solution having a total weight of 17 parts of a mixture consisting of 1 part by weight of sodium carboxymethyl cellulose with a predetermined substitution of approximately 0.6 and viscosity of 2,000-5,000 cP and 16 parts by weight of methyl and dimethyl naphthalene sulfonate (a ratio of the cellulose polymer to the surfactant being 1:16), and 83 parts by weight of water.

TABLE I

| Sample | Treatment Rate (pints/ton) | % Coal Moisture | CAD (Feet) | % Reduction of CAD |
|---|---|---|---|---|
| 1 | 0.0 | 35 | 10.3 | 0.0 |
| 2 | 5.5 | 35 | 6.5 | 36.9 |
| 3 | 0.0 | 35 | 4.0 | 0.0 |
| 4 | 4.5 | 35 | 2.8 | 30.0 |
| 5 | 0.0 | 38 | 6.0 | 0.0 |
| 6 | 5.5 | 38 | 5.2 | 13.3 |
| 7 | 5.5 | 38 | 4.7 | 21.7 |
| 8 | 5.5 | 38 | 4.3 | 28.3 |

In another series of tests at a treatment rate of 4.5 pints/ton of particles with a 35% moisture content, the results shown in TABLE II were observed. Sample 1 employs no aqueous solution applied to the particles so as to establish a base from which the percent reduction in the Critical Arching Dimension (CAD) is determined. Sample 2 employs an aqueous solution having a total weight of 12 parts of a mixture consisting of 2 parts by weight of sodium carboxymethyl cellulose with a predetermined substitution of approximately 0.7 and a viscosity of 30-50 cP and 10 parts by weight of methyl and dimethyl naphthalene sulfonate (a ratio of the cellulose polymer to surfactant being 1:5), and 88 parts by weight of water. Sample 3 employs an aqueous solution having a total weight of 11 parts of a mixture consisting of 1 part by weight of sodium carboxymethyl cellulose with a predetermined substitution of from 0.6 to 0.7 and a viscosity of 1,500-2,500 cP and 10 parts by weight of methyl and dimethyl naphthalene sulfonate (a ratio of the cellulose polymer to surfactant being 1:10), and 89 parts by weight of water. Sample 4 employs an aqueous solution having a total weight of 12 parts of a mixture consisting of 2 parts by weight of sodium carboxymethyl cellulose with a predetermined substitution of approximately 0.7 and a viscosity of 80-200 cP and 10 parts by weight of methyl and dimethyl naphthalene sulfonate (a ratio of the cellulose polymer to surfactant being 1:5), and 88 parts by weight of water. Sample 5 employs an aqueous solution having a total weight of 12 parts of a mixture consisting of 2 parts by weight of sodium carboxymethyl cellulose with a predetermined substitution of approximately 0.7 and a viscosity of 250–500 cP and 10 parts by weight of methyl and dimethyl naphthalene sulfonate (a ratio of the cellulose polymer to surfactant being 1:5), and 88 parts by weight of water. Sample 6 employs an aqueous solution having a total weight of 12 parts of a mixture consisting of 2 parts by weight of sodium carboxymethyl cellulose with a predetermined substitution of approximately 0.7 and a viscosity of 15–30 mPas and 10 parts by weight of methyl and dimethyl naphthalene sulfonate (a ratio of the cellulose polymer to surfactant being 1:5), and 88 parts by weight of water. Sample 7 employs an aqueous solution having a total weight of 12 parts of a mixture consisting of 2 parts by weight of sodium carboxymethyl cellulose with a predetermined substitution of approximately 0.55 and a viscosity of 500–1,500 cPs and 10 parts by weight of methyl and dimethyl naphthalene sulfonate (a ratio of the cellulose polymer to surfactant being 1:5), and 88 parts by weight of water.

TABLE II

| Sample | CAD | % Reduction in CAD |
|---|---|---|
| 1 | 2.5 | 0.0 |
| 2 | 1.8 | 28.0 |
| 3 | 1.0 | 60.0 |
| 4 | 0.8 | 68.0 |
| 5 | 0.8 | 68.0 |
| 6 | 0.55 | 78.0 |
| 7 | 0.4 | 84.0 |

In another series of tests at a treament rate of 4.5 pints/ton of coal particles, the results shown in TABLE III were observed. Sample 1 employs no aqueous solution applied to the particles so as to establish a base from which the percent reduction in the Critical Arching Dimension (CAD) is determined. Sample 2 employs an aqueous solution having a total weight of 14.8 parts of a mixture consisting of 2 parts by weight of sodium carboxymethyl cellulose with a predetermined substitution of approximately 0.7 and a viscosity of 30–50 cP and 12.8 parts by weight of methyl and dimethyl naphthalene sulfonate (a ratio of the cellulose polymer to surfactant being 1:6.4), and 85.2 parts by weight of water. Sample 3 employs an aqueous solution having a total weight of 12 parts of a mixture consisting of 2 parts by weight of sodium carboxymethyl cellulose with a predetermined substitution of approximately 0.55 and a viscosity of 500–1,500 cPs and 10 parts by weight of methyl and dimethyl naphthalene sulfonate (a ratio of the cellulose polymer to surfactant being 1:5), and 88 parts by weight of water. Sample 4 employs an aqueous solution having a total weight of 4.5 parts of a mixture consisting of 2 parts by weight of sodium carboxymethyl cellulose with a predetermined substitution of approximately 0.55 and a viscosity of 500–1,500 cPs and 2.5 parts by weight of methyl and dimethyl naphthalene sulfonate (a ratio of the cellulose polymer to surfactant being 1:1.5), and 95.5 parts by weight of water.

TABLE III

| | | Particle Moisture Level | | |
|---|---|---|---|---|
| Sample | 34 | 35 | 38 | 40 |
| 1 CAD | 2.2 | 2.7 | 4.8 | 7.0 |
| % Reduction | 0.0 | 0.0 | 0.0 | 0.0 |
| 2 CAD | — | 2.2 | 3.6 | 4.6 |
| % Reduction | — | 22.2 | 25.0 | 34.3 |
| 3 CAD | — | 1.7 | 2.6 | 3.7 |
| % Reduction | — | 37.0 | 45.8 | 47.1 |
| 4 CAD | 1.3 | 1.6 | 2.4 | 3.5 |
| % Reduction | 40.9 | 40.7 | 50.0 | 50.0 |

In another series of tests at a treatment rate of 4.5 pints/ton of lignite coal particles at a moisture level of 38%, the results shown in TABLE IV were observed. Sample 1 employs no aqueous solution applied to the particles so as to establish a base from which the percent reduction in the Critical Arching Dimension (CAD) is determined. Sample 2 employs an aqueous solution having a total weight of 4.5 parts of a mixture consisting of 2 parts by weight of sodium carboxymethyl cellulose with a predetermined substitution of approximately 0.55 and a viscosity of 500–1,500 cPs and 2.5 parts by weight of methyl and dimethyl naphthalene sulfonate (a ratio of the cellulose polymer to surfactant being 1:1.5), and 95.5 parts by weight of water.

TABLE IV

| | Instaneous | | 48 hours later | |
|---|---|---|---|---|
| Sample | CAD | % Reduction | CAD | % Reduction |
| 1 | 4.8 | 0.0 | 10.3 | 0.0 |
| 2 | 2.5 | 47.9 | 5.4 | 47.5 |

In another series of tests at a treatment rate of 5.5 pints/ton of lignite coal particles at a moisture level of 34%, the results shown in TABLE V were observed. Sample 1 employs no aqueous solution applied to the particles so as to establish a base from which the percent reduction in the Critical Arching Dimension (CAD) is determined. Sample 2 employs an aqueous solution having no cellulose polymer, 16 parts by weight of methyl and dimethyl naphthalene sulfonate and 84 parts weight of water so as to establish the improvement obtained by the addition of the cellulose polymer. Sample 3 employs an aqueous solution having a total weight of 10 parts sodium carboxymethyl cellulose with a predetermined substitution of approximately 0.7 and a viscosity of 30–50 cP, and 90 parts by weight of water. Sample 4 employs an aqueous solution having a total weight of 16.4 parts of a mixture consisting of 2 parts by weight of sodium carboxymethyl cellulose with a predetermined substitution of approximately 0.7 and a viscosity of 30–50 cP and 14.4 parts by weight of methyl and dimethyl naphthalene sulfonate (a ratio of the cellulose polymer to surfactant being 1:7.2), and 83.6 parts by weight of water.

TABLE V

| Sample | CAD (Feet) | % Reduction in CAD |
|---|---|---|
| 1 | 8.3 | — |
| 2 | 7.1 | 14.5 |
| 3 | 4.8 | 42.2 |
| 4 | 4.8 | 42.2 |

In another series of tests at a treatment rate of 5.5 pints/ton of lignite coal particles at a moisture level of 35%, the results shown in TABLE VI were observed.

Sample 1 employs no aqueous solution applied to the particles so as to establish a base from which the percent reduction in the Critical Arching Dimension (CAD) is determined. Sample 2 employs an aqueous solution having 2 parts by weight of hydroxyethyl cellulose with a predetermined substitution of 12.0 and a viscosity of 300–400 cP, and 98 parts by weight of water so as to demonstrate the effectiveness this cellulose polymer.

TABLE VI

| Sample | CAD (Feet) | % Reduction in CAD |
|---|---|---|
| 1 | 3.6 | — |
| 2 | 2.7 | 25.0 |

The invention having been described, what is claimed is:

1. A method of improving flow characteristics of water insoluble solid particles while inhibiting caking characteristics of the particles, comprising: causing the particles to flow from one location to another location; and applying an aqueous solution to the flowing particles, the aqueous solution including a water soluble polymer derived from cellulose in an amount sufficient to inhibit the caking characteristics of the particles.

2. A method as set forth in claim 1, further comprising: the water insoluble solid particles including lignite coal particles and the polymer being nonabsorbent relative to the coal particles.

3. A method as set forth in claim 2, further comprising: the water soluble polymer derived from cellulose constituting from about 1 to about 10 percent by weight of the aqueous solution.

4. A method as set forth in claim 1, further comprising: the water soluble polymer derived from cellulose constituting from about 1 to about 10 percent by weight of the aqueous solution.

5. A method as set forth in claim 1, further comprising: the aqueous solution including a mixture consisting of sodium carboxymethyl cellulose and one or more of the materials selected from the group consisting of methyl and dimethyl naphthalene sulfonates and ethoxylated linear secondary alcohols with from 11 to 15 carbon atoms.

6. A method as set forth in claim 5, further comprising: the mixture including the sodium carboxymethyl cellulose constituting from about 1 to about 10 percent by weight of the aqueous solution and the one or more of the materials selected from the group consisting of methyl and dimethyl naphthalene sulfonates and ethoxylated linear secondary alcohols constituting from about 0 to about 16 percent by weight of the aqueous solution.

7. A method as set forth in claim 5, further comprising: the mixture being from about 2 to about 17 percent by weight of the aqueous solution.

8. A method as set forth in claim 7, further comprising: the mixture including a weight ratio of the sodium carboxymethyl cellulose to the one or more of the materials selected from the group consisting of methyl and dimethyl naphthalene sulfonates and ethoxylated linear secondary alcohols being from about 10:0 to about 1:16.

9. A method as set forth in claim 5, further comprising: the water insoluble solid particles including lignite coal particles and the polymer being nonabsorbent relative to the coal particles.

10. A method as set forth in claim 9, further comprising: the mixture including the sodium carboxymethyl cellulose constituting from about 1 to about 10 percent by weight of the aqueous solution and the one or more of the materials selected from the group consisting of methyl and dimethyl naphthalene sulfonates and ethoxylated linear secondary alcohols constituting from about 0 to about 16 percent by weight of the aqueous solution.

11. A method as set forth in claim 9, further comprising: the mixture being from about 2 to about 17 percent by weight of the aqueous solution.

12. A method as set forth in claim 11, further comprising: the mixture including a weight ratio of the sodium carboxymethyl cellulose to the one or more of the materials selected from the group consisting of methyl and dimethyl naphthalene sulfonates and ethoxylated linear secondary alcohols being from about 10:0 to about 1:16.

13. A method as set forth in claim 1, further comprising: the water soluble polymer derived from cellulose being sodium carboxymethyl cellulose.

14. A method as set forth in claim 13, further comprising: the sodium carboxymethyl cellulose having a predetermined substitution of from about 0.1 to about 3.0.

15. A method of improving flow characteristics of water insoluble solid coal particles while inhibiting caking characteristics of the particles, comprising: causing the particles to flow from one location to another location; and applying an aqueous solution to the flowing particles, the aqueous solution including a mixture consisting of sodium carboxymethyl cellulose having a predetermined substitution of from about 0.4 to about 0.7 and one or more of the materials selected from the group consisting of methyl and dimethyl naphthalene sulfonates and ethoxylated linear secondary alcohols with from 11 to 15 carbon atoms, the mixture being from about 2 to about 17 percent by weight of the aqueous solution and including a weight ratio of the sodium carboxymethyl cellulose to the one or more of the materials selected from the group consisting of methyl and dimethyl naphthalene sulfonates and ethoxylated linear secondary alcohols being from about 10:0 to about 1:16, the sodium carboxymethyl cellulose constituting from about 1 to about 10 percent by weight of the aqueous solution and the one or more of the materials selected from the group consisting of methyl and dimethyl naphthalene sulfonates and ethoxylated linear secondary alcohols constituting from about 0 to about 16 percent by weight of the aqueous solution.

16. A composition of matter to improve flow characteristics of water insoluble solid coal particles while inhibiting caking characteristics of the particles, comprising: an aqueous solution including a water soluble mixture being (a) from about 2 to about 17 percent by weight of the aqueous solution (b) consisting of sodium carboxymethyl cellulose having a predetermined substitution of from about 0.4 to about 0.7 and one or more of the materials selected from the group consisting of methyl and dimethyl naphthalene sulfonates and ethoxylated linear secondary alcohols with from 11 to 15 carbon atoms, (c) having a weight ratio of the sodium carboxymethyl cellulose to the one or more of the materials selected from the group consisting of methyl and dimethyl naphthalene sulfonates and ethoxylated linear secondary alcohols being from about 10:0 to about 1:16, and (d) the sodium carboxymethyl cellulose constituting from about 1 to about 10 percent by weight of the aqueous solution and the one or more of the materials selected from the group consisting of methyl and dimethyl naphthalene sulfonates and ethoxylated linear secondary alcohols constituting from about 0 to about 16 percent by weight of the aqueous solution.

* * * * *